R. M. HEAD.
INTERNAL COMBUSTION ENGINE.
APPLICATION FILED MAY 10, 1912.
1,156,075.
Patented Oct. 12, 1915.
10 SHEETS—SHEET 3.
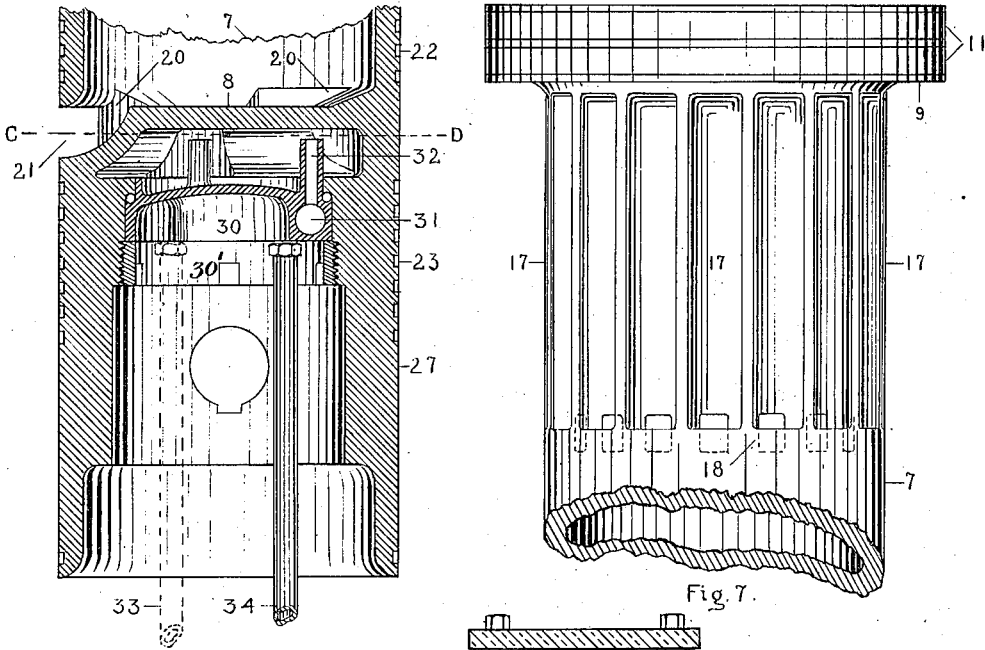
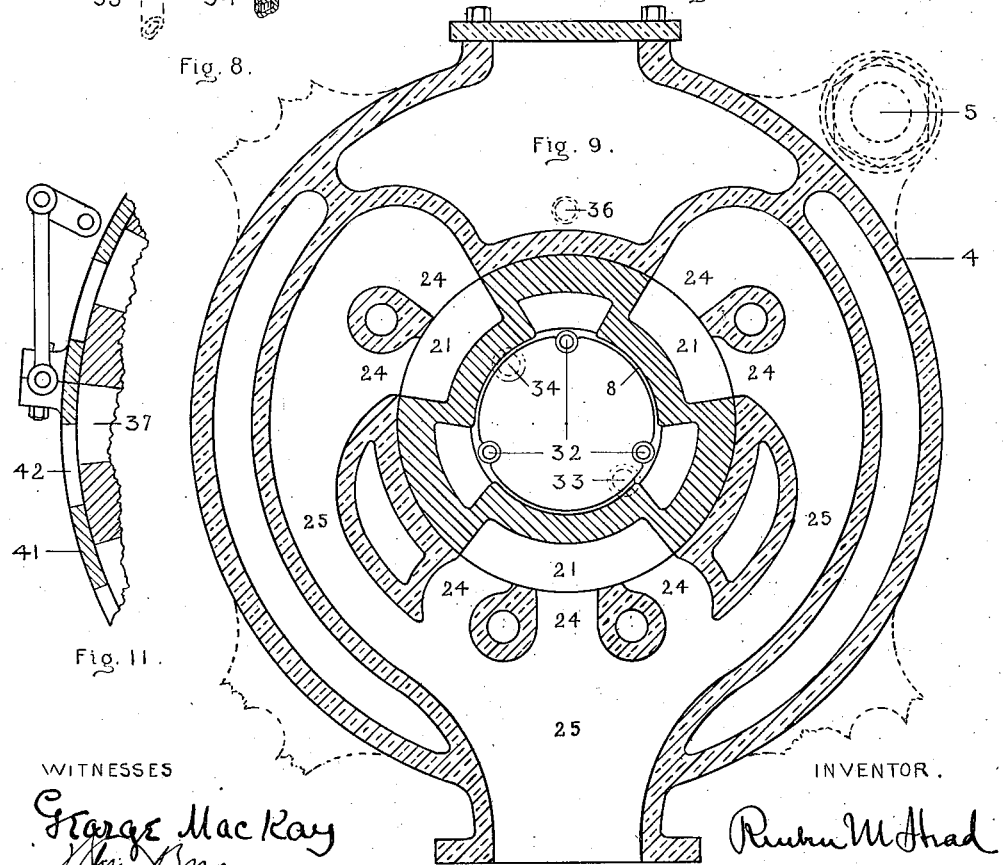
WITNESSES
INVENTOR.

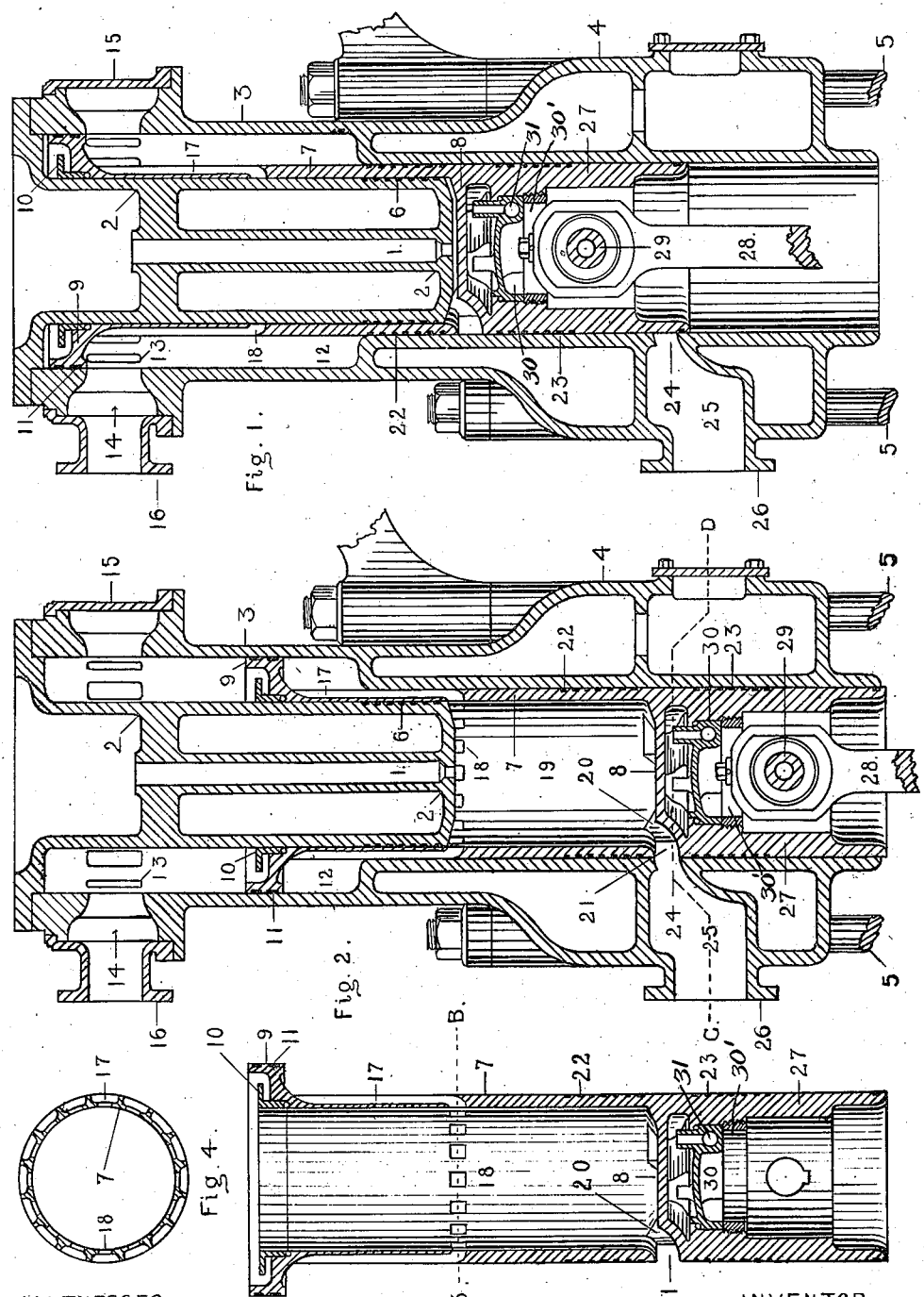

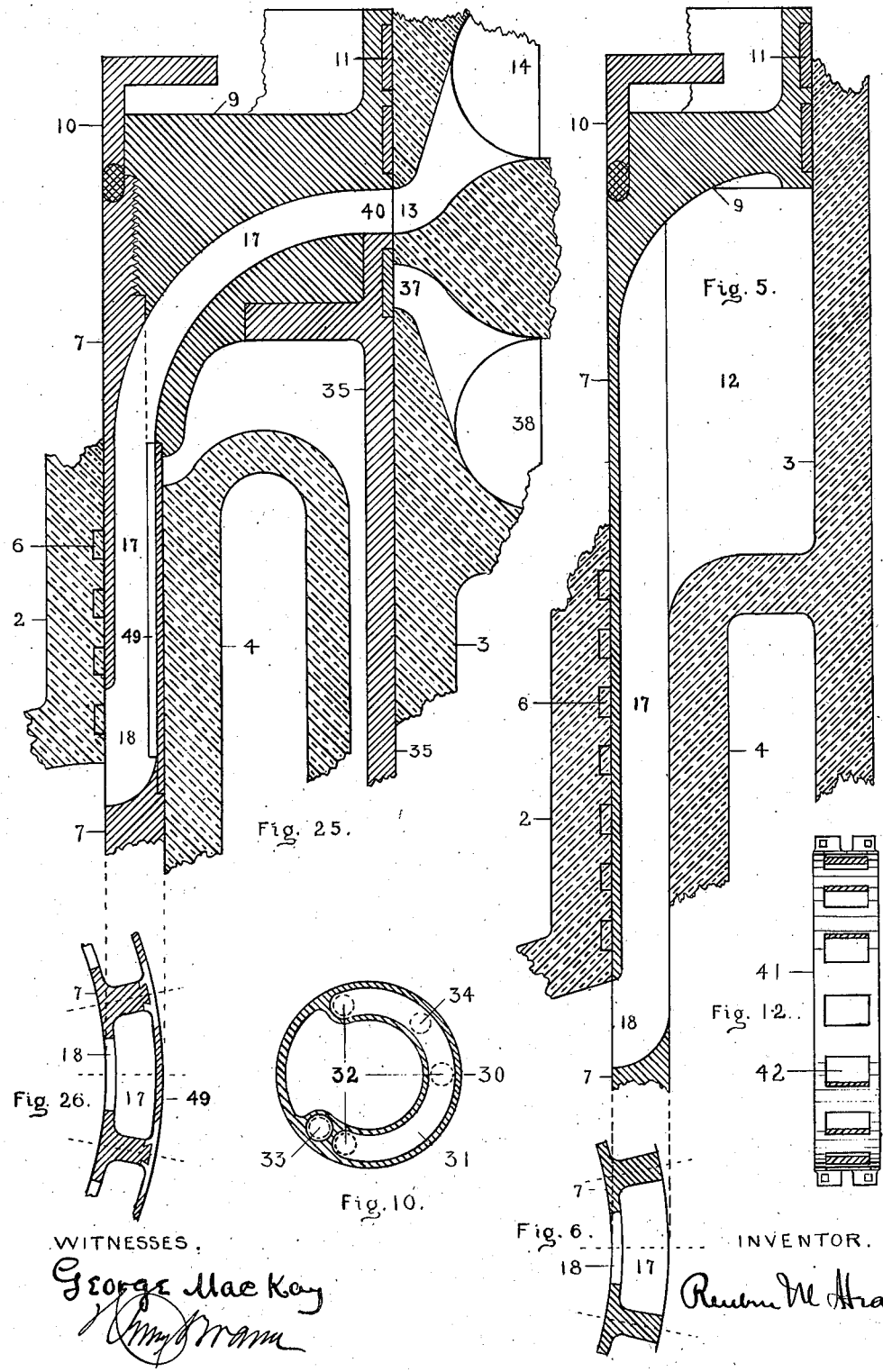

R. M. HEAD.
INTERNAL COMBUSTION ENGINE.
APPLICATION FILED MAY 10, 1912.
1,156,075.
Patented Oct. 12, 1915.
10 SHEETS—SHEET 4.
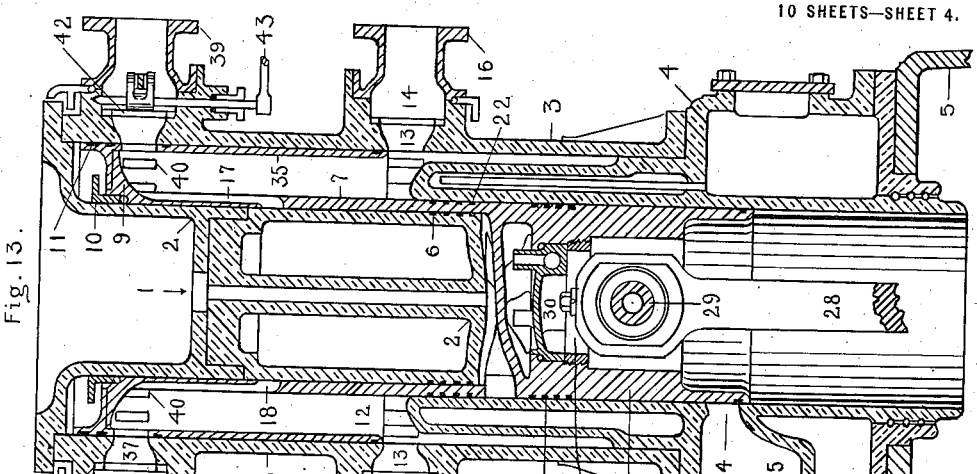
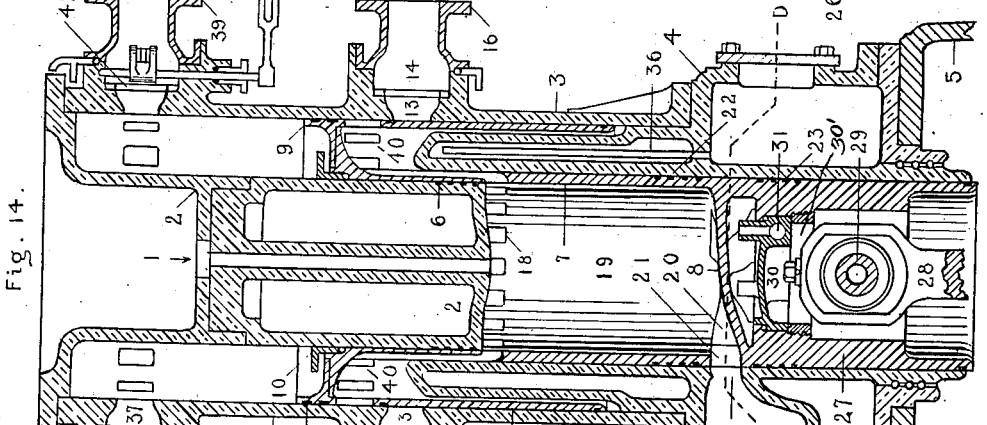
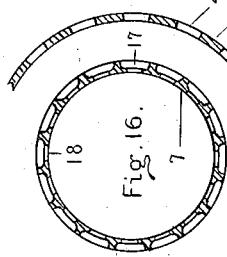
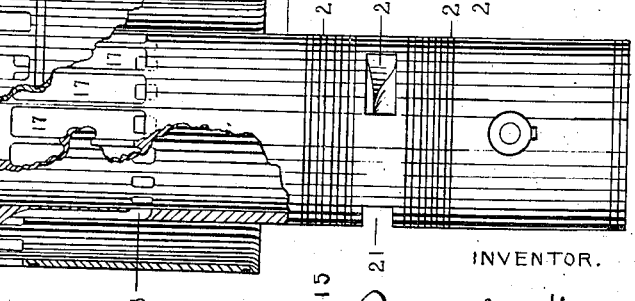
WITNESSES.
George MacKay
INVENTOR.
Reuben M. Head

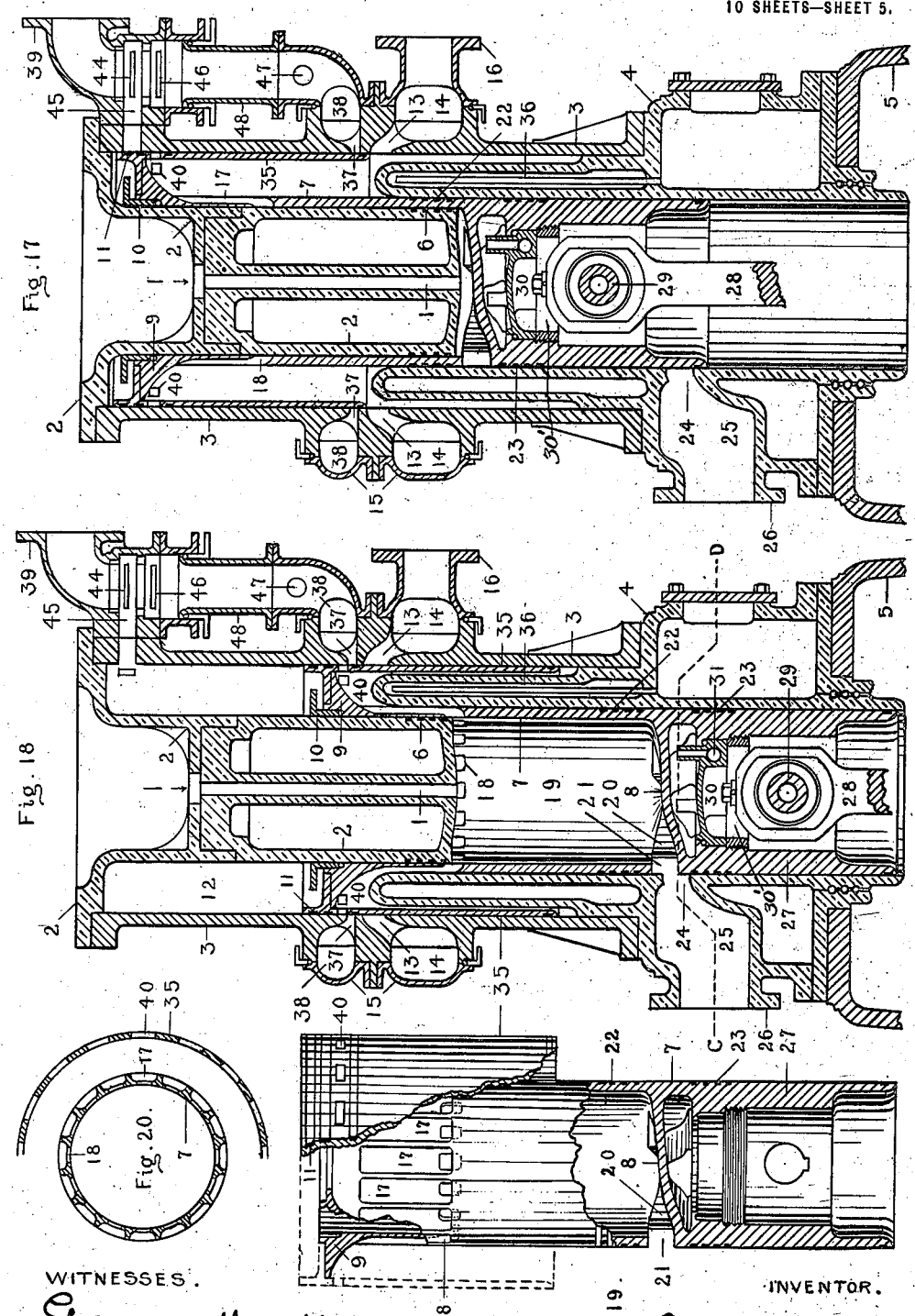

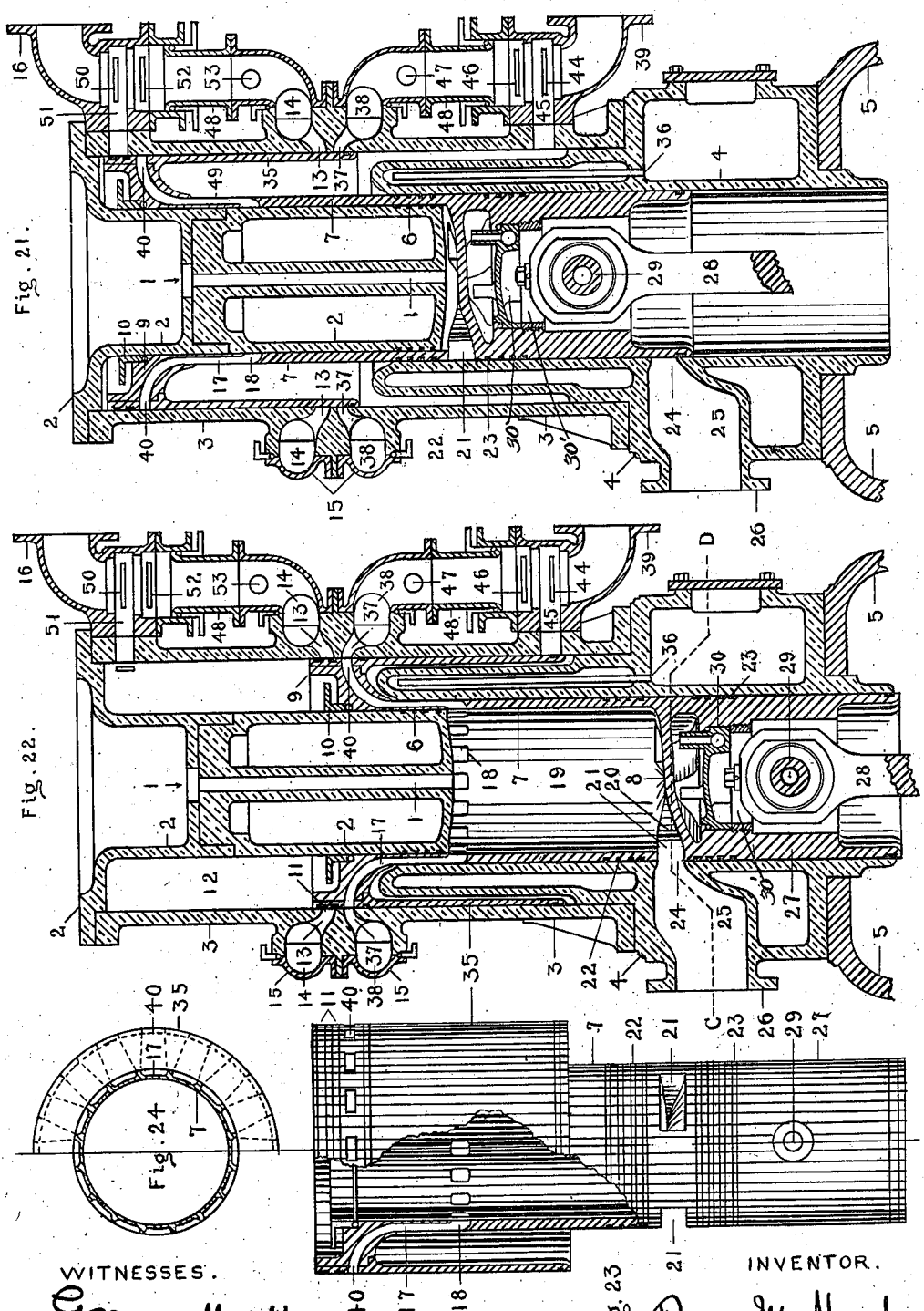

R. M. HEAD.
INTERNAL COMBUSTION ENGINE.
APPLICATION FILED MAY 10, 1912.
1,156,075.
Patented Oct. 12, 1915.
10 SHEETS—SHEET 7.
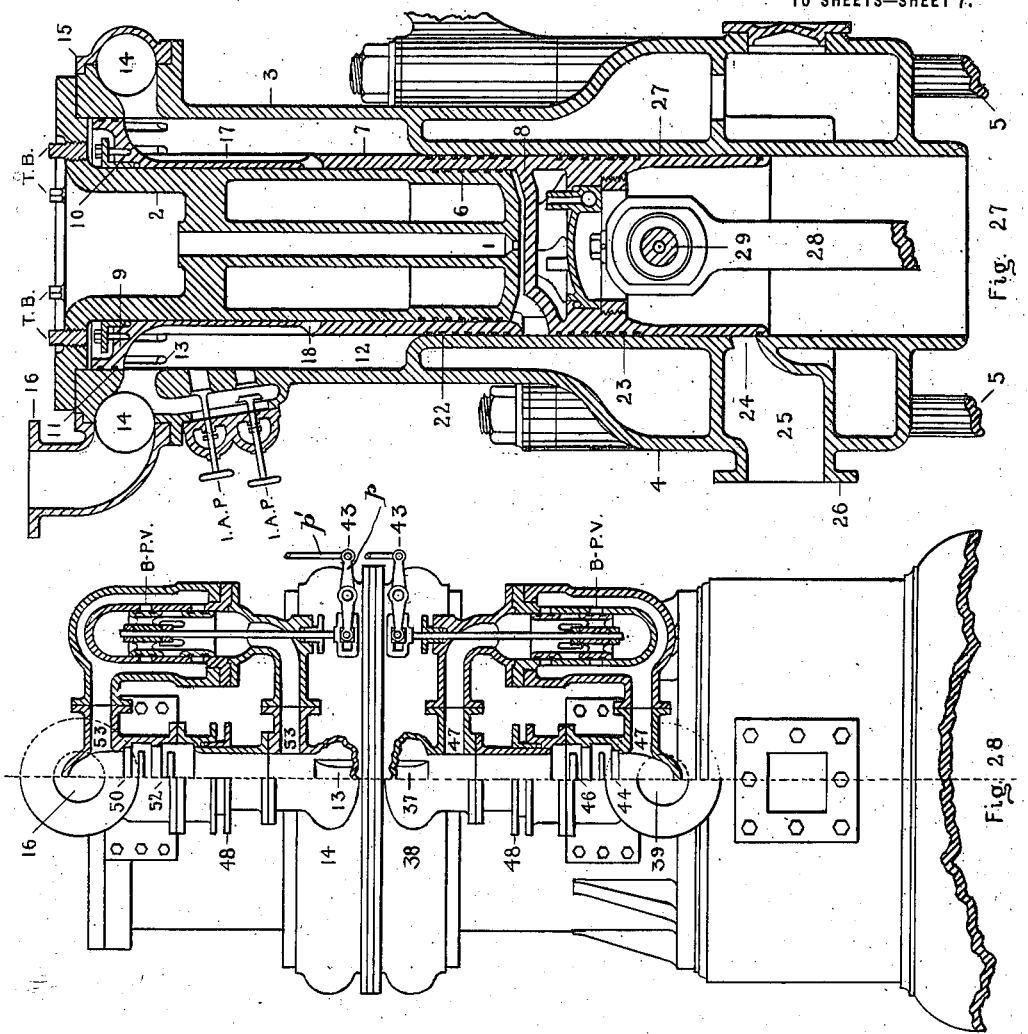
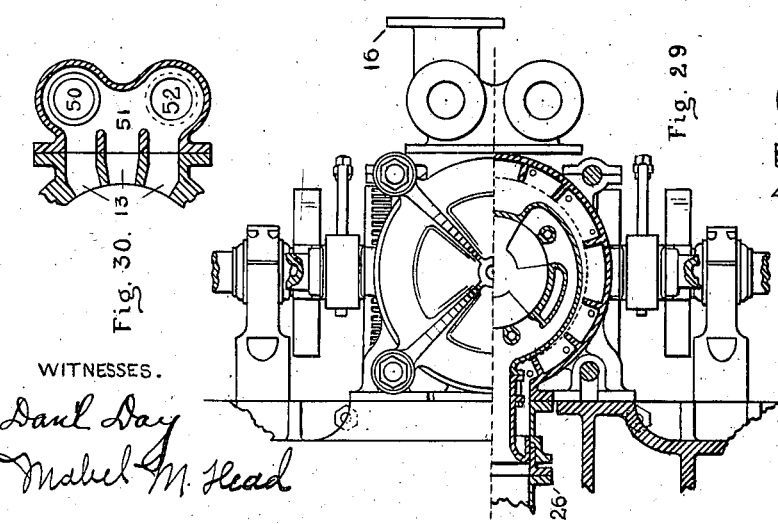
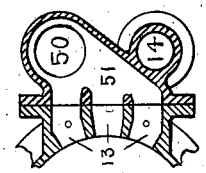
WITNESSES.
Daul Day
Mabel M. Head
INVENTOR.
Reuben M. Head

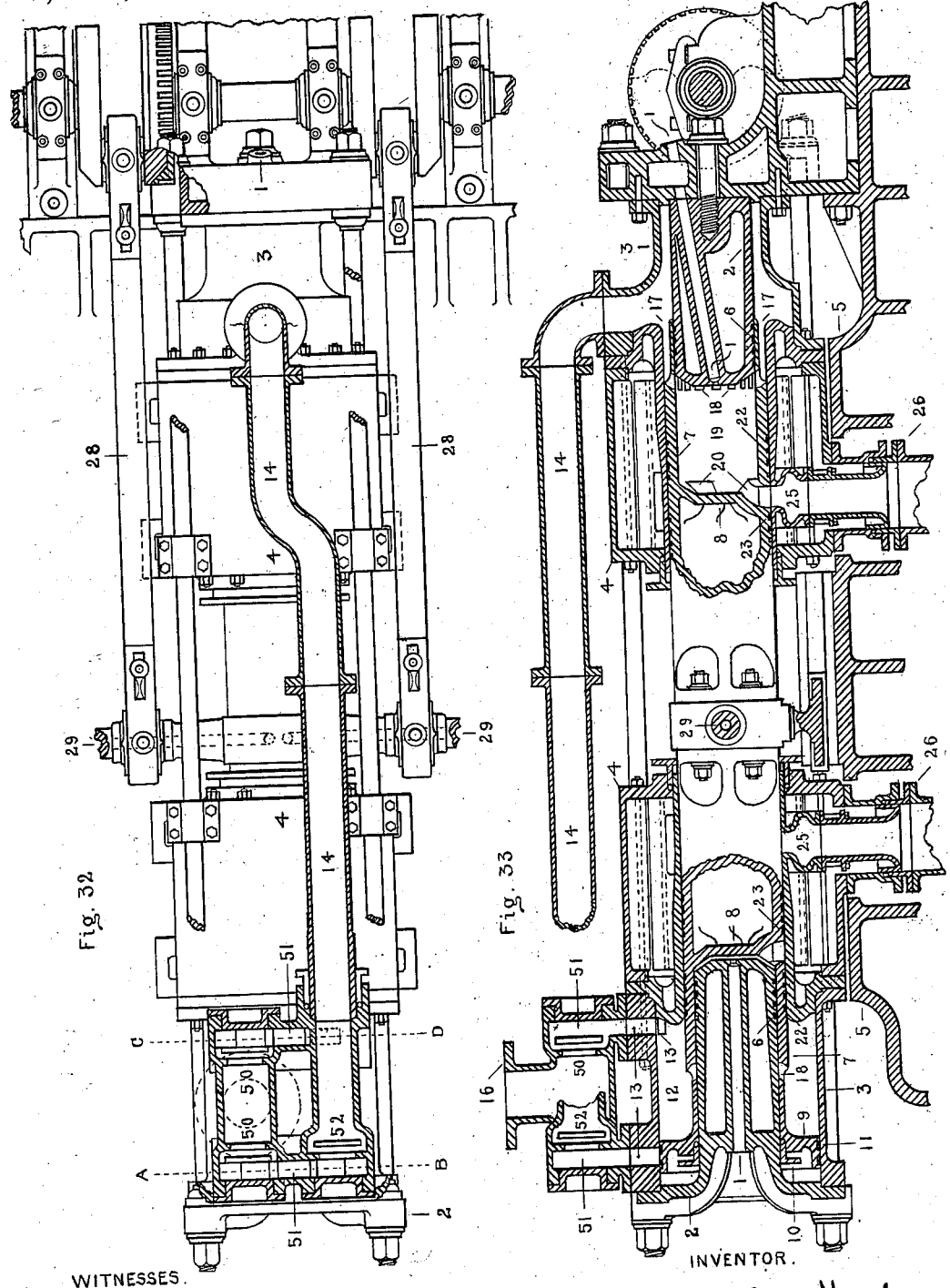

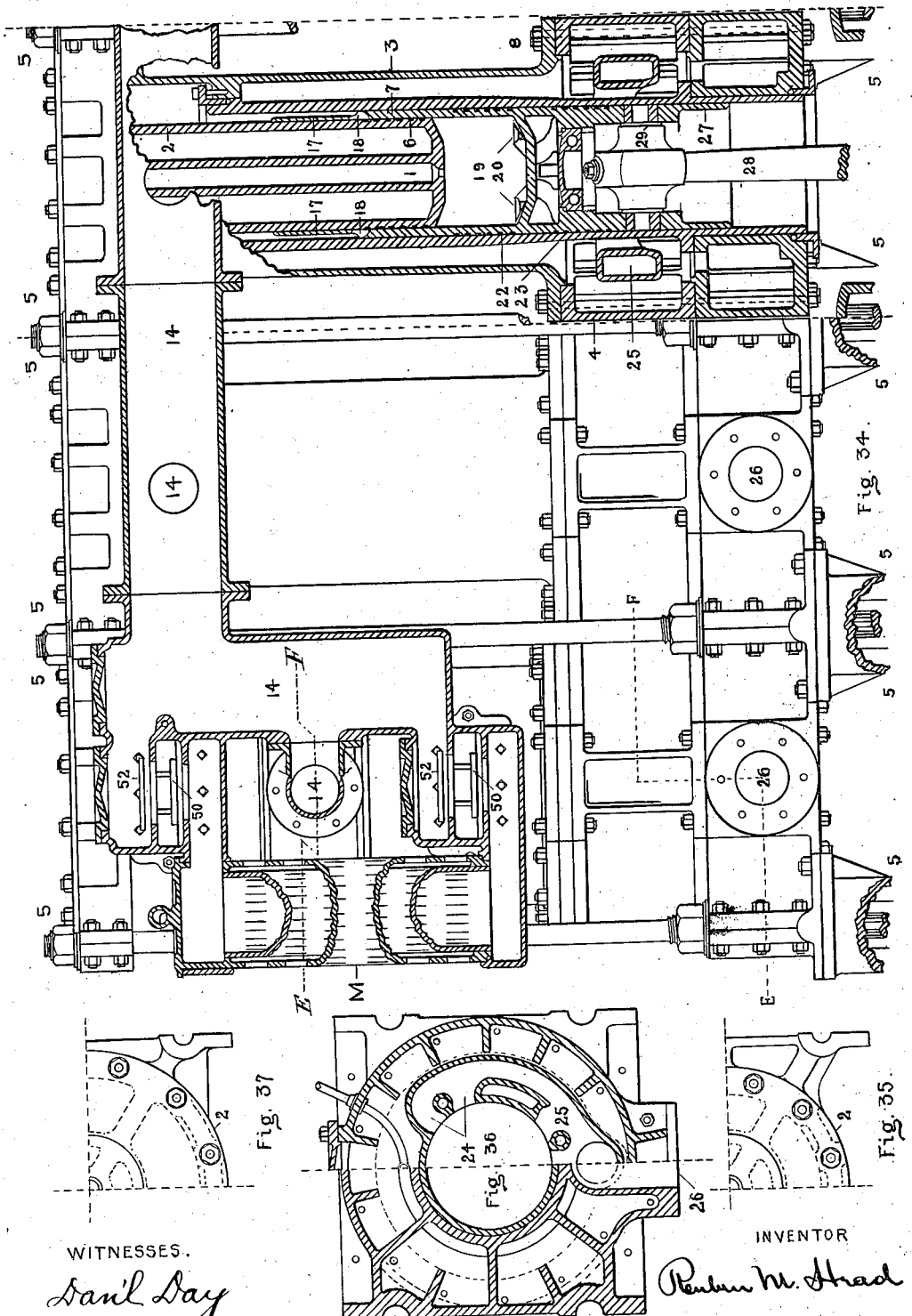

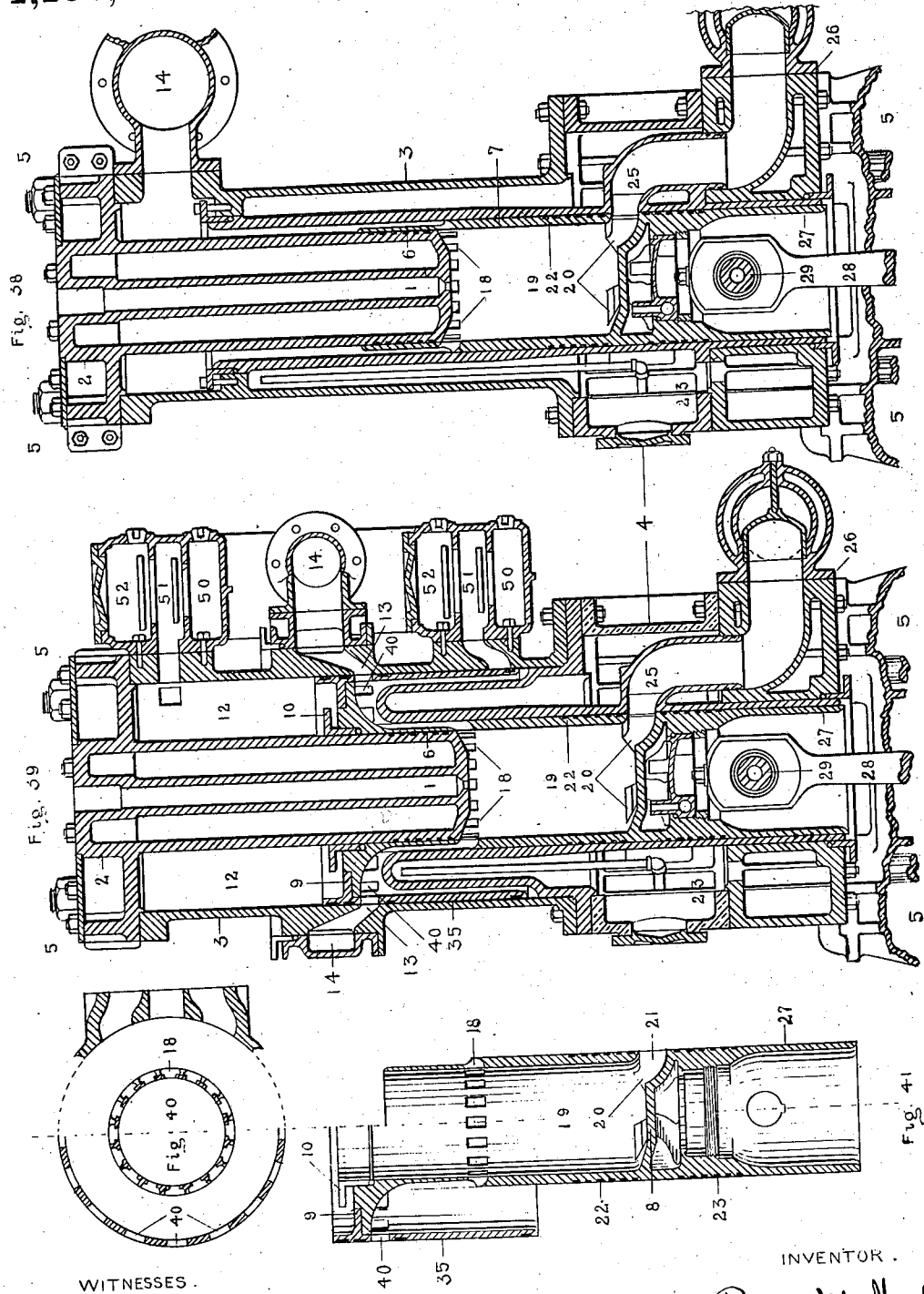

UNITED STATES PATENT OFFICE.

REUBEN M. HEAD, OF PITTSBURGH, PENNSYLVANIA.

INTERNAL-COMBUSTION ENGINE.

1,156,075.	Specification of Letters Patent.	Patented Oct. 12, 1915.

Application filed May 10, 1912. Serial No. 696,408.

*To all whom it may concern:*

Be it known that I, REUBEN M. HEAD, a citizen of the United States, residing at Pittsburgh, in the county of Allegheny and State of Pennsylvania, have invented a new and useful Improvement in Internal-Combustion Engines, of which the following is a specification.

The objects of my improvements are as follows:—1. To provide efficient "end-to-end" scavenging of the combustion space, without the use of inlet valves of the puppet type; and, to introduce the air therefor, and the charge of gas, or combustible, through channels removed from the heat of combustion, at the moment of ignition. 2. To increase the efficiency of the scavenging air and gas pump, by releasing, or introducing, the content thereof, through short connecting passages, into the combustion space, at a moment, coincident with, the attainment of maximum compression, of the same in the pump chamber. 3. To eliminate, as far as possible, "back-firing", or preignition, of the incoming charge of combustible. 4. To increase the mechanical efficiency, by decreasing frictional losses, in eliminating, as far as possible, all extraneous driving gear, usually connected with inlet valves, and the air or gas pump.

Referring to the accompanying drawings, Figure 1 is a central vertical section of a Diesel type of engine, showing one form of my invention with the parts in the positions assumed when the crank pin is at its upper or outer dead center; Fig. 2, a view like Fig. 1 with the parts in the positions assumed when the crank pin is at its lower or inner dead center; Fig. 3, a central longitudinal section of the piston sleeve and the pump and power pistons; Fig. 4, a transverse section on the line A—B, Fig. 3; Fig. 5, an enlarged vertical section showing a portion of the piston sleeve and pump and adjacent parts; Fig. 6, a cross-section through the port 18, Fig. 5; Fig. 7, an enlarged side elevation of the pump piston and the upper half of the piston sleeve; Fig. 8, an enlarged central vertical section of the power piston and the lower end of the piston sleeve; Fig. 9, a still more enlarged section on the line C—D, Figs. 2 and 8; Fig. 10, a section of the stuffing-box fitting with the stand-pipe outlets for cooling the piston; Fig. 11, a horizontal section of the ported collar and the adjacent parts for controlling the admission of air, gas, or gasolene; and Fig. 12, is an elevation of one of the halves of which the said collar is composed. Figs. 13 to 16 are views of the same character as Figs. 1 to 4, but showing my invention adapted for using natural gas or gasolene. Figs. 17 to 20 are of the same character as Figs. 1 to 4, but illustrating a third form of my invention, adapted for using coke-oven, blast-furnace, or other lean gas. Figs. 21 to 24 are similar views showing a fourth form of my invention adapted for using producer gas. Fig. 25 is an enlarged vertical section of the pump piston, the piston sleeve and adjacent parts of the engine shown in Figs. 21 to 24; and Fig. 26 is a cross-section of the piston sleeve (Fig. 25). Fig. 27 is a central vertical section of an engine of the type shown in Fig. 1, showing means for adjusting the packing glands and for varying the volume and compression of the scavenging air; Fig. 28 is a half vertical section and a half side elevation of the engine shown in Figs. 21 and 22, illustrating by-passes and valves therefor. Fig. 29 is a half section and a half end view of a double-acting, tandem type of the Diesel engine. Figs. 30 and 31 are sections of portions of the same. Fig. 32 is a top plan view, partly in section, looking to the left at Fig. 29. Fig. 33 is a longitudinal vertical section of Fig. 32. Fig. 34 is a side elevation, partly in section, showing a multi-cylinder type of Diesel engine. Figs. 35 and 37 are plan views of a portion of the upper end of Fig. 34. Fig. 36 is a cross-section on the line E—F, Fig. 34. Fig. 38 is a central vertical section of the engine at the right side of Fig. 34 and Fig. 39 is a similar section of the engine at the left side of Fig. 34. Fig. 40 is a transverse section through the ports 18 and 40, Fig. 39, parts being omitted. Fig. 41 is a vertical section of the pump and power pistons, the piston sleeve, and the trunk, the right half representing the parts as they are in Fig. 38, and the left half as they are in Fig. 39.

Referring first to the Diesel type of engine illustrated in Figs. 1 to 10, 1 is the opening for the atomizing valve through which oil fuel is sprayed. 2 is a deep jacketed cylinder head which is attached to the sleeve extension 3 of the water-jacketed cylinder 4, secured to the frame or columns 5. Packing rings 6 upon the inner end of the cylinder head, block the escape of gas, or combustible, past the inner surface of the piston sleeve 7, which connects the power piston 8, with the pump piston 9. A stuffing box, packing ring and gland 10, forming part of the pump piston, bears against the cylindrical surface of the cylinder head, and may be adjusted for wear, through openings T B (Fig. 27), closed by tap bolts, in the flange portion of the cylinder head, without removing the latter. Packing rings 11, of the pump piston 9, traverse the inner surface of the sleeve extension 3, forming the pump chamber 12, communicating through a ring of ports 13, with the air passage 14, formed by the flanged collar 15, which, by this construction, facilitates the connection, radially, of the intake union 16. The sleeve 7, near its connection with the pump piston, has a ring of channels, or passages 17 (see Figs. 5, 6 and 7) cut longitudinally therein, terminating in openings, or ports 18, through which, when the piston sleeve is at or near, the end of an inner, or power stroke, the contents of the pump chamber are delivered, into the combustion space 19, formed by the power piston, sleeve and cylinder head. The piston 8 has segmental depressions therein, forming compression pockets 20 (see Figs. 8 and 9) which, in the other types of engine illustrated, are formed by raising, or depressing, alternate radial sections, of the piston crown. These pockets, or depressions, connect the combustion space with the exhaust outlets 21, flanked by packing rings 22 and 23, upon the piston sleeve, which block the escape of gas, or combustible between the cylinder 4 and the contiguous portions of the power piston and the sleeve. At the completion of a power stroke with the piston in a position co-incident with the crank pin at the lower, or inner dead center, as shown by Fig. 2, these outlets 21 register with the openings, or ports 24, of the exhaust passage 25, whose connection with the exhaust pipe or manifold is formed by the union 26. Piston sleeve 7 has an extension forming the trunk 27 of piston 8, to which the connecting rod 28 is attached by wrist pin 29. The piston 8 is hollow below the bottom of the combustion chamber. The upper end of the hollow is transversely closed by the crown or partition 30 (Figs. 8, 9, and 10) so as to form a water-cooled chamber between the said partition and the bottom of the combustion chamber. The partition 30 contains the horizontal passage 31 connecting with the stand pipe outlets 32 opening into the water-cooled chamber. Water is supplied to the latter chamber by the inlet 33 and taken therefrom by the outlet pipe 34. The circulation of water through this chamber cools the piston. With air, as the cooling medium, these connections are reversed, the stand pipe outlets then becoming the nozzles, by which the air, previously passed through a cooler, is impinged directly upon the hottest portion of the piston. Fig. 1 shows both pistons, sleeve and corelated parts, at the conclusion of an outward stroke, in position co-incident with arrival of crank pin, at its outer dead center. In this outward stroke, the pump piston creates a vacuum in the pump chamber 12, which, with the uncovering of the ports 13 is filled with fresh air. At the same time, the power piston compresses the air, passed into the combustion space 19, at the conclusion of the preceding inward stroke, until, near the end of its outward travel, the fuel valve 1 opens, and the oil injected therefrom is ignited by the heat due to the compression attained. The pressure created by the oil injected is maintained, until, with the passing of the inward, or power outer dead center, the stroke commences, after which the fuel valve closes. The hot gases in combustion expand, driving the piston toward the exhaust ports 24, with whose partial uncovering, an approximate equalization of pressure is effected with the atmosphere. The sleeve 7 draws the inlet ports 18 past the cylinder head 2, opening the passages 17, through which fresh air in the pump chamber, compressed, by this inward stroke of its piston, is released, at the maximum density attained, into the combustion space; where, upon expansion, it displaces the residual burnt gases therein, through the outlets 21, which are now in full registration with the exhaust ports 24, as shown by Fig. 2, illustrating the position of the above enumerated parts, at the end of an inward, or power stroke, co-incident, with the crank pin at the lower, or inner dead center. On the succeeding outward stroke of the piston, the inlet ports underrun the cylinder head, closing the passages therefrom. The closing of the exhaust outlets follow, and the air, retained thereby, is compressed in the combustion space, until, in this outward travel, the piston again reaches the point, where the fuel valve opens; whereupon, with the passing of the outer dead center, the cycle commences anew.

In the Diesel type of engine, the air control can be effected by intermediate air-ports controlled by the valve I. A. P. (Fig. 27) and over-run by the pump-piston while reciprocating, which ports can be opened or closed to suit the volume and compression required, thereby giving greater flexibility and ability to meet the demands of an overload, when more oil is being consumed than under normal conditions.

In Figs. 13 to 16, illustrating this improvement, as applied to the use of illuminating, or natural gas, or gasolene, the external diameter of the jacket-wall of the cylinder is reduced for a portion of its length, forming with the sleeve 3 an annular extension of the pump chamber, which extension is traversed by the annular trunk 35 on the piston 9. This, in an engine of the vertical type shown, necessitates the use of stand pipes 36, for circulating the jacket water. In this construction, the ring of air inlet ports 13 and the passage, or reservoir 14, connected therewith, is shifted to a point, intermediate the length of cylinder sleeve 3, forming the pump chamber 12, into which gas is admitted, through the ring of ports 37 connected with gas passage, or receiver, 38, whose intake is through the union 39, which, in an engine using gasolene, may connect with a carbureter. The piston trunk 35 has a ring of ports 40, which, in the open position, at the end of an outward stroke, register with the gas inlet ports 37 (see Fig. 13). The depth, or length, of this trunk, is such that the air inlet ports 13 are opened and closed, co-incidently and proportionately, with the gas inlet ports. The annular gas passage 38 contains an annular valve or collar 41, provided with the ports 42 arranged to register with the gas inlet ports 37. The collar 41 may slide over the ports 37 so as to throttle the gas supply. The collar is slid by means of the link b, connecting the rock-shaft mechanism 43 with a governor or other controlling device. During the outward stroke of the pump piston, a vacuum is created in the pump chamber, which, with the opening of ports 13 and 37, is filled with air and gas, in the predetermined relative volume, as modified by the throttling action of the collar 41. Simultaneously, with this vacuum stroke of the pump piston, the power piston, in its outward stroke, compresses the charge, of air and gas, passed into the combustion space, at the end of the preceding inward stroke, until, with the passing of the outer dead center, it is ignited by the spark plug in the opening 1. With this, the commencement of an inward, or power stroke, the gases expand, until, upon uncovering the exhaust ports 24, a partial equalization of pressures is effected with the atmosphere. The inlet ports 18 now open, releasing the contents of the pump chamber, at the maximum compression attained therein, by this inward stroke of its piston. The stratum of scavaging air enters first, displacing residual burnt gases from the combustion space. The gas stratum follows and, with the residual scavaging air, retained, in the combustion space, by the closing of the ports 18 and 24, on the ensuing outward stroke, is compressed, until, with the passing of the outer dead center, it is ignited by the spark plug, whereupon the cycle is repeated.

In the simple type of gas engine, described in the preceding, the pump piston is single acting, driving the contents of the pump chamber from its inner face, and dependent upon the alleged stratification of the air and gas elements of the charge, as well as, the effective cooling of the inlet passages, obtained by their removal, during the period of greatest heat, from the combustion space, to prevent a "back fire", from the latter, into the pump chamber, causing pre-ignition of its contents. With the thickness of cylinder wall and jacket space due to internal, or effective diameters, of the piston sleeve, of about fifteen inches, it is possible to secure, for the types of engine hereafter described, relative, proportionate volumes of the air and gas elements, to that of the combustion space, in accord with present practice, and to separate these elements in the pump chamber, thereby obtaining greater security against the possibilities of pre-ignition.

In Figs. 17 to 20, illustrating this improvement as applied to the use of coke oven, blast furnace, or other lean gas, the air and gas elements, of the charge, are separated by the pump piston, and driven by the opposite faces of the same. As the changes and additions necessary to this type of construction, are confined to appurtenances of the cylindrical sleeve, forming the pump chamber, the numerical description, of the associated parts, previously given, for the other types of engine, is omitted, the same being applicable here, for the parts illustrated, up to, and including, those connected with the air supply. The gas supply enters, during a suction stroke of the pump piston 9, through the union 39, passing an automatic inlet valve 44 of the thin, sheet steel type, into the valve chest 45, connecting with the pump chamber 12, from whence, it is driven, on the succeeding outward stroke, through the delivery valve 46, of similar type to the valve 44, into the reservoir, or receiver, 38, whose annular ports 37, during this outward, or compression, stroke of the pump piston, are closed by the trunk 35 overlapping the same, until, at the end of the ensuing inward, or suction, stroke the annular ports 40 register therewith, whereupon, the gas released into the clearance space, passes through the channels 17, into the combustion space 19. The trunk 35 is provided with packing rings and oil grooves in sufficient number, to prevent the escape of gas, at the low pressure employed, past its exterior face, where, in uniting with residual gas, in the clearance space on the air side of the pump piston, it might accumulate in sufficient volume to form an explosive mixture, in the pump chamber. Quality regulation of the engine is effected by connecting the outlet 47 with a "by pass" valve B—P V (Fig. 28). The valve stem is connected by the lever p and the link p' to a governor, whereby a portion of the charge is returned, past the suction side of the valve chest, to the gas supply. If quantity regulation is desired, the throttling of the air in the passage 14 may be effected by various governing devices, for example, by the herein described throttling collar 41. The removable section 48 gives access to the valve chest, by removal of the delivery valve seat, whereupon, the inlet valve may be removed. On an outward stroke of the pump piston, gas drawn into the pump chamber, during the previous inward stroke of its piston, is compressed into the reservoir, or receiver 38; and, at the same time, a vacuum is created on the air side of the pump chamber, which, at the end of this outward stroke, is filled with air, from the reservoir 14. Coincidently, with this outward stroke of the pump piston, the power piston, in its outward travel, compresses the charge of gas and air passed into the combustion space, at the end of the previous inward stroke, until, with the passing of the outer dead center, it is ignited by the spark plug 1. With this, the commencement of an inward, or power stroke, the hot gases expand, driving the piston toward the exhaust ports 24, with whose partial opening, an approximate equalization of pressures is affected with the atmosphere. The inlet ports 18 now open, releasing the scavaging air, compressed to its maximum density, by this inward stroke of the pump piston, into the combustion space, as shown by Fig. 18, whereupon, the residual burnt gases are displaced therefrom. A further movement of the piston, toward the lower, or inner, dead center, as shown by this figure, brings the annular ports 40, into register with the ports 37, whereby, the gas is released, through the clearance space and passages 17, into the combustion space 19. On the ensuing outward stroke, the inlet and exhaust ports are successively closed, and the gas and residual air retained thereby, is compressed, until, with the passing of the outer dead center, the charge is ignited by the spark plug 1, whereupon, the cycle commences anew.

In Figs. 21 to 24, illustrating this improvement, as applied to an engine using producer gas, the proportionate volume of the gas element, to that of combustion space, is smaller than in an engine utilizing the leaner gases, described in the preceding, necessitating, a reversal of the air and gas connections, with the pump chamber, and the complete inclosure of the transfer passages 17, as shown in enlarged detail by Figs. 25 and 26. The description previously given, will be found applicable to the type of construction now to be described, up to and including those parts associated with the gas element of the charge, which is now driven from the inner face of the pump piston, in that portion of the pump chamber, whose content, reduced by connecting sleeve and trunk, gives the requisite proportionate volume of gas to combustion space. To secure complete separation of the air and gas elements of the charge, until their introduction into the combustion space, the piston 9 is provided with extensions of the passage 17, which terminate in ports, or openings 40, (see Fig. 25.) The transfer passages 17, are inclosed by a band 49, of thin steel, or other metal, brazed circumferentially to sleeve and piston, and, may, be attached in manner shown, by Figs. 26, to the central web of the divisions, forming the passages herewith described. This inclosing band, or collar 49, (which may also be formed by a sleeve extension of the pump piston 9,) necessarily constricts the sectional area of the passages 17, but the total transverse area of the passages shown, is greater than any single inlet valve, of the puppet type, which can be placed in a cylinder head, of like dimensions, whose spark plug, or fuel valve, is in the center, without offsetting, or forming a pocket, for the valve seat, in the clearance space. The air supply enters, during a suction stroke of the pump piston 9, through the union 16, passing the automatic inlet valve 50, of the thin sheet steel type, into the valve chest 51, connecting with the pump chamber 12. From the chest 51 it is driven, on the ensuing outward stroke, past the delivery valve 52, of similar type to the valve 50, into the reservoir, or receiver, 14, whose annular ports 13, during this outward, or compression, stroke of the pump piston, are closed by the trunk 35 overlapping the same, until, near the end of the succeeding inward, or suction, stroke, the annular ports 40 register therewith, whereupon, the air is released through the passages 17, into the combustion space 19. The trunk 35 is provided with packing rings and oil grooves in sufficient number, for the purpose previously specified. Quality regulation of the engine is affected by connecting the outlet 47 with a "by pass" valve, indicated by B—P V on Fig. 28, and controlled by the governor, as stated for the preceding type of engine. Quantity regulation if desired, can be had by connecting the outlet 53, with a "by pass" valve, Fig. 28, similarly controlled, whereby a portion of the air is returned, past the suction side of the valve chest, to the supply pipe. Removable sections 48 give access to the valve chests, in the manner previously described. During an outward stroke, air drawn into the pump chamber, upon a previous inward stroke of its piston, is compressed into the receiver 14; while, at the same time, a charge of gas is drawn into the pump chamber. Simultaneously, with this outward stroke of the pump piston, the power piston, in its outward travel, compresses the charge of gas and air, passed into the combustion space, at the end of the previous inward stroke, until, with the passing of the outer dead center, it is ignited by the spark plug in the opening 1. With this, the commencement of an inward, or power stroke, the hot gases expand, driving the piston toward the exhaust ports 24, with whose partial opening, an approximate equalization of pressures is effected with the atmosphere. The inlet ports 18 are now opened, and, at the same instant, the annular ports 40 are brought into register with the ports 13, releasing the scavaging air, through the passages 17 into the combustion space, whereupon, the residual burnt gases are displaced therefrom. A further movement of the piston, in concluding the stroke, as shown by Fig. 22, brings the annular ports 40 into register with the ports 37, whereupon, the gas, compressed by this inward stroke of the pump piston, in the reservoir 38 is released, through the passages 17 into the combustion space 19. On the ensuing outward stroke, the inlet and exhaust ports are successively closed and the gas and residual air retained thereby, is compressed, until with the passing of the outer dead center, the charge is ignited by the spark plug in the opening 1, whereupon the cycle is repeated.

I do not limit myself to the construction, herewith illustrated, since it is obvious that many changes, in the form and arrangement of parts, can be made, without departing from the invention, as herewith illustrated and described, it being possible, in the Diesel, or other type of engine employing a hot tube or equivalent ignition device, to use air pumps of other design, or construction, from that illustrated, by omitting the pump piston 9 from the connecting sleeve 7, as described in the following; an arrangement, more economically, effected in double-acting, tandem, or multi-cylinder engines, of this type, whereby, the air pump, of one cylinder, provided with intake and delivery valves, can be made double-acting, or of such capacity, as is sufficient, to deliver, through connecting reservoirs, or receivers, the necessary air for scavaging and combustion of the fuel oil, in the opposed, or opposite cylinders, whose connecting sleeve 7, and longitudinal passages 17, simply act in a valvular capacity, the pump piston 9 being omitted, thereby securing a simpler, cheaper construction; and, perhaps, in multi-cylinder engines, of shorter length.

In Figs. 29 to 33, illustrating the double-acting, tandem type of Diesel engine, the inner face of the pump piston 9 drives the air previously drawn past the intake valve 50 into the pump chamber, through the passages 17 and the ports 18 into the combustion space of the cylinder connected therewith at the end of an in-stroke; while the outer face of the pump piston 9, during an out-stroke, drives the air previously drawn past the intake valve 50 into the pump chamber, through the delivery valve 52, connecting the reservoir 14 and the inlet passage 17 and into the combustion space of the opposed cylinder, whose inlet ports 18 open at the end of an out-stroke co-incidently with the attainment of maximum compression of the scavenging air.

In Figs. 34 to 41, illustrating the multi-cylinder type of Diesel engine, the inner face of the pump piston 9 has a trunk 35, shown in the left half of Fig. 41 similar to that shown in Fig. 19, which closes the ports 13 during suction and delivery strokes until, at the end of an inner or power stroke, the trunk ports 40 register with the ports 13 connecting with the reservoir 14, whereupon a portion of the air passed through the intake and delivery valves 50 and 52 is released from the reservoir 14 into the combustion space of the cylinder to which it is attached. The outer face of the pump piston 9 functions through the upper intake and delivery valves 50 and 52, connecting with the reservoir 14, whence a portion of the air is released through the inlet passage 17 and ports 18 into the combustion space of the cylinders opposite, as the sleeved pistons connected therewith successively conclude an inner or power stroke. In this, and in the preceding type of Diesel engine, wherein the piston sleeve 7 of the opposed or opposite cylinders acts solely in a valvular capacity, the dividing or strengthening webs, forming the longitudinal passages 17, can be omitted from the sleeve 7, as shown by the right half of Fig. 41, whereby an increase in the sectional area of the longitudinal passages 17 is obtained. This increase in the sectional area of the inlet passage 17 is also obtainable for light, high speed engines of the Diesel type, first described, as well as for similar engines of the types illustrated by Figs. 13 to 20, where the pump piston 9 is integral in construction with the sleeve 7, provided the material employed therein is of exceptional strength.

The description for the Diesel type, first given with respect to Figs. 1 to 10, is applicable to the last two types illustrated, the letter "M", however, in Fig. 34 indicating a "muffler" of perforated tubular construction, affording a simple and direct connection with the intake valves 50, as shown in said figure.

Having thus described my invention, what I claim, and desire to secure by Letters Patent, is:—

1. In an internal combustion engine, a power cylinder having lateral exhaust ports, a hollow power piston reciprocable in the said cylinder and provided with a sleeve extension, the crown of the piston having circumferentially arranged alternate depressed and elevated portions, from the outer ends of which depressed portions exhaust ports lead to the exterior of the said piston, the last named ports arranged to register with the first named ports coincidently with the passing of the inner dead center, and means for supplying a cooling fluid within the hollow in the piston to cool the interior surface of the crown opposite the said depressed and elevated portions.

2. In an internal combustion engine, a power cylinder having lateral exhaust ports, a hollow power piston reciprocable in the said cylinder and provided with a sleeve extension, the crown of the piston having circumferentially arranged alternate depressed and elevated portions, from the outer ends of which depressed portions exhaust ports lead to the exterior of the said piston, the last named ports arranged to register with the first named ports coincidently with the passing of the inner dead center, means for supplying a cooling fluid within the hollow in the piston to cool the interior surface of the crown opposite the said depressed and elevated portions, and means for making the contiguous surfaces of the sleeve and cylinder gas tight.

3. In an internal combustion engine, a power piston, a pump piston, a sleeve connecting the said pistons, a cylinder, in contact with whose interior surface the said pistons and sleeve may reciprocate, a cylinder head extending into the outer end of the sleeve, and a pump chamber between the cylinder and the sleeve, and between the pump piston and a transverse wall opposite the cylinder head and nearer the outer end of the cylinder than the inner end of the cylinder head, the sleeve having in its substance longitudinal passages terminating at their inner ends in ports through the sleeve, the said ports being arranged to communicate with the interior of the sleeve between the cylinder head and the power piston when the latter is passing the inner dead center and the said passages at their outer ends communicating with the said pump chamber.

4. In an internal combustion engine, a power piston, a pump piston, a sleeve connecting the said pistons, a cylinder, in contact with whose interior surface the said pistons and sleeve reciprocate, a cylinder head extending into the outer end of the sleeve, a pump chamber between the cylinder and the sleeve, and between the pump piston and a transverse wall opposite the cylinder head and nearer the outer end of the cylinder than the inner end of the cylinder head, the sleeve having in its substance longitudinal passages terminating at their inner ends in ports through the sleeve, the said ports being arranged to communicate with the interior of the sleeve between the cylinder head and the power piston when the latter is passing the inner dead center and the said passages at their outer ends communicating with the said pump chamber, and a water jacket surrounding the power piston and overlapping the inner end of the cylinder head.

5. In an internal combustion engine, a cylinder having one end of greater internal diameter than the other, a power piston reciprocable in the smaller portion of the cylinder, a pump piston reciprocable in the larger portion thereof, a cylinder head extending through the larger portion of the cylinder and into the smaller portion, a piston sleeve fixed to the two pistons and slidable internally on the said cylinder head and externally on the inner surface of the smaller portion of the cylinder, longitudinal passages in the sleeve opening into the space between the sleeve and the larger portion of the cylinder and also terminating in ports arranged to communicate with the space between the power piston and the cylinder head when the piston is passing its inner dead center, the larger diameter terminating at its junction with the smaller diameter, and a water-jacket surrounding the portion of the cylinder having the smaller diameter, the water-jacket being opposite the combustion chamber from the cylinder head to the power piston.

6. In an internal combustion engine, a cylinder having one end of greater diameter than the other, a sleeve reciprocable within and on the portion having the smaller diameter and extending into the other portion, a pump piston extending outwardly from the outer end of the sleeve and reciprocable within and on the larger portion of the cyinder, a chamber surrounding the larger portion of the cylinder and having ports communicating with the chamber between the pump piston and the wall connecting the two portions of the cylinder, a ring valve movable over the said ports and having ports arranged to register with the first named ports, and means for moving the ring valve to vary degree of registry of the said ports.

7. In an internal combustion engine, a cylinder having one end of greater diameter than the other, a sleeve reciprocable within and on the portion having the smaller diameter and extending into the other portion, a pump piston extending outwardly from the outer end of the sleeve and reciprocable within and on the larger portion of the cylinder, two chambers surrounding the larger portion of the cylinder and provided with ports communicating with the chamber between the pump piston and the wall connecting the two portions of the cylinder, a power piston fixed to the inner end of the sleeve, a depressed cylinder head extending into the sleeve and overlapping the smaller portion of the cylinder, means for connecting the said chamber with the combustion chamber between the power piston and the inner end of the cylinder head when the piston is at the end of its inner stroke, and means for cutting off communication of the first two chambers with the other chamber when the pistons and sleeve have moved slightly on their inner stroke.

8. In an internal combustion engine, a cylinder having one end of greater diameter than the other, a sleeve reciprocable within and on the portion having the smaller diameter and extending into the other portion, a pump piston extending outwardly from the outer end of the sleeve and reciprocable within and on the larger portion of the cylinder, two chambers surrounding the larger portion of the cylinder and provided with ports communicating with the chamber between the pump piston and the wall connecting the two portions of the cylinder, a power piston fixed to the inner end of the sleeve, a depressed cylinder head extending into the sleeve and overlapping the smaller portion of the cylinder, means for connecting the said chamber with the combustion chamber between the power piston and the inner end of the cylinder head when the piston is at the end of its inner stroke, and a trunk concentric with the sleeve and slidable on the larger portion of the cylinder to cut off communication between one of said first two chambers and the pump chamber, the pump piston cutting off the communication between the pump chamber and the remaining one of the said first two chambers.

9. In an internal combustion engine, a cylinder having one end of greater diameter than the other, a sleeve reciprocable within and on the portion having the smaller diameter and extending into the other portion, a pump piston extending outwardly from the outer end of the sleeve and reciprocable within and on the larger portion of the cylinder, two chambers surrounding the larger portion of the cylinder and provided with ports communicating with the chamber between the pump piston and the wall connecting the two portions of the cylinder, a power piston fixed to the inner end of the sleeve, a depressed cylinder head extending into the sleeve and overlapping the smaller portion of the cylinder, means for connecting the said chamber with the combustion chamber between the power piston and the inner end of the cylinder head when the piston is at the end of its inner stroke, a trunk concentric with the sleeve and slidable on the larger portion of the cylinder to cut off communication between one of said first two chambers and the pump chamber, the pump piston cutting off the communication between the pump chamber and the remaining one of the said first two chambers, and means for connecting the said pump chamber with the chamber between the power piston and the inner end of the cylinder head when the piston is at the end of its inner stroke.

10. In an internal combustion engine, a power piston, a pump piston, a sleeve connecting the pistons, a cylinder in contact with the interior surface of which the pistons and sleeve may reciprocate, a cylinder head extending into the outer end of the sleeve, a pump chamber between the cylinder and the sleeve and between the pump piston and a transverse wall and nearer the outer end of the cylinder than the inner end of the cylinder head, the outer end of the sleeve being reduced in thickness, there being ports through the reduced sleeve wall, so arranged as to communicate with the interior of the sleeve between the cylinder head and the power piston when the latter is passing the inner dead center.

11. In an internal combustion engine, a power piston, a pump piston, a sleeve connecting the said pistons, a cylinder in which the pistons and sleeve may reciprocate, and a cylinder head extending through and beyond the pump piston and into the sleeve, and overlapping a portion of the cylinder which is in contact with the sleeve, and a water jacket encircling the cylinder adjacent to the inner end of the cylinder head.

In testimony whereof I have signed my name to this specification in the presence of two subscribing witnesses.

REUBEN M. HEAD.

Witnesses:
 WILLIAM BALLINTINE,
 JACOB GREENBERGER.